SNOW THROWERS
Original Filed June 5, 1961 2 Sheets-Sheet 1
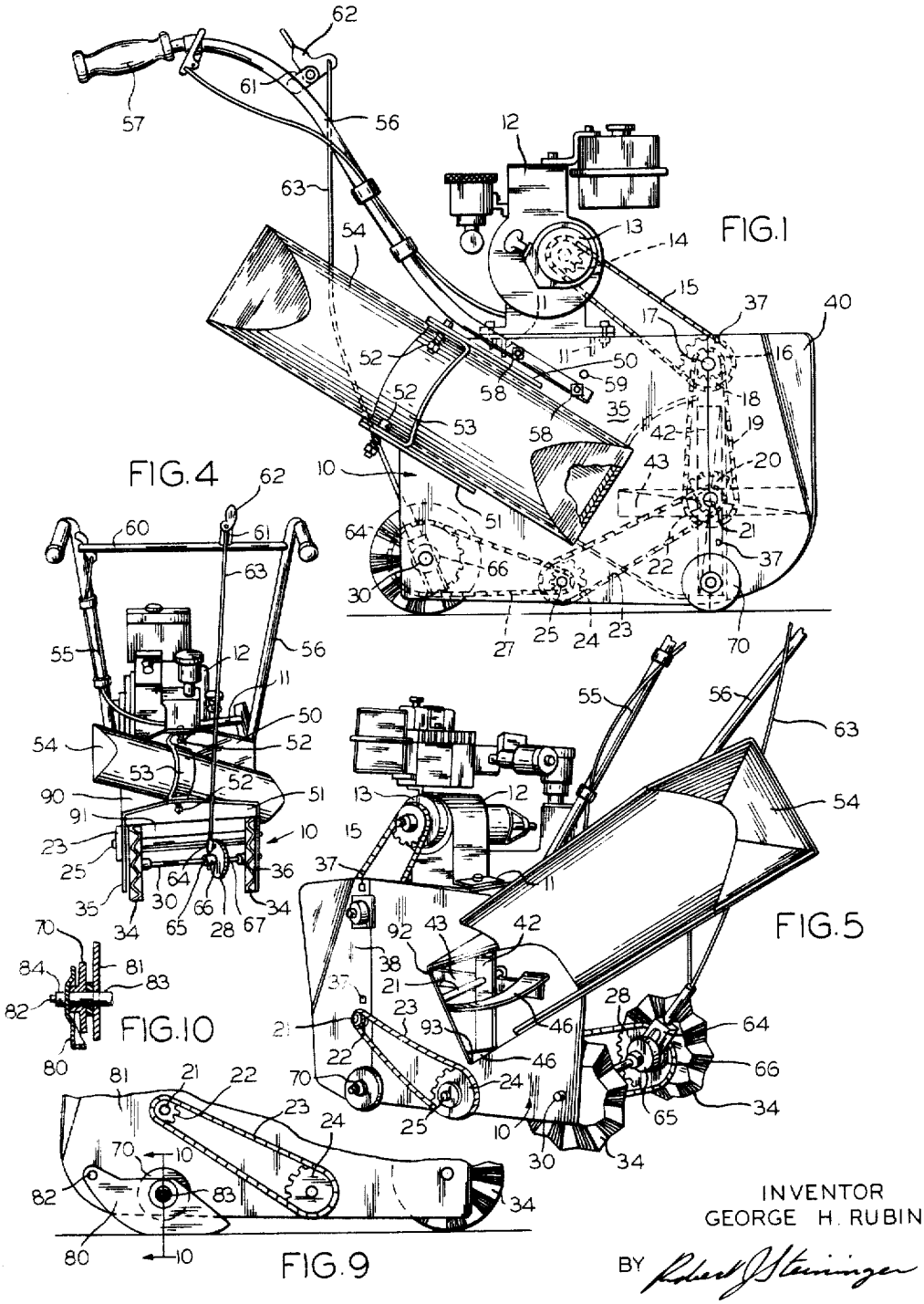
INVENTOR
GEORGE H. RUBIN
BY Robert J. Steininger
ATTORNEY SNOW THROWERS
Original Filed June 5, 1961 2 Sheets-Sheet 2
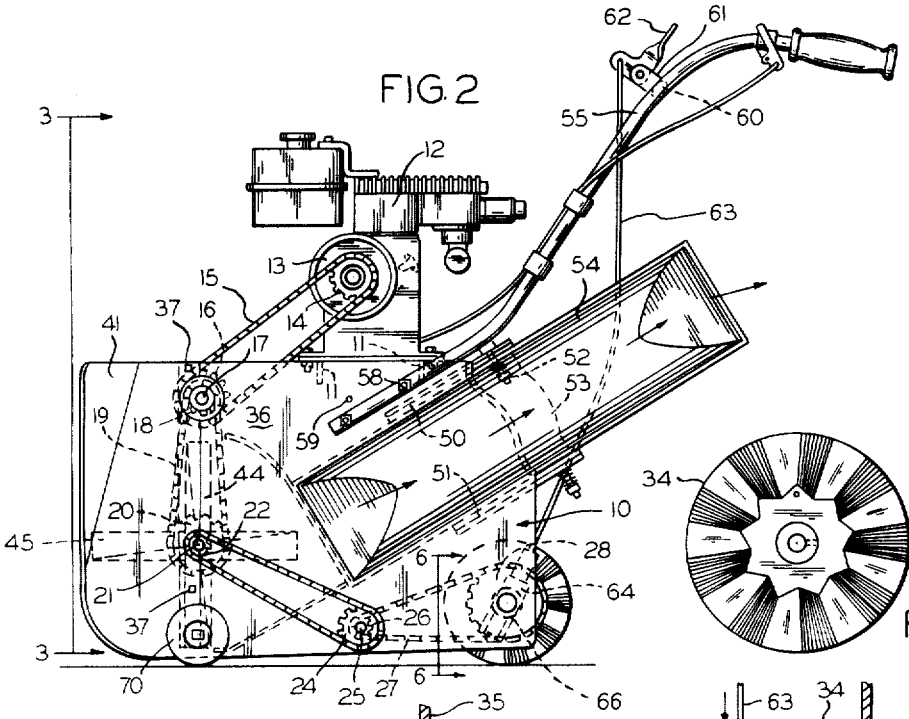
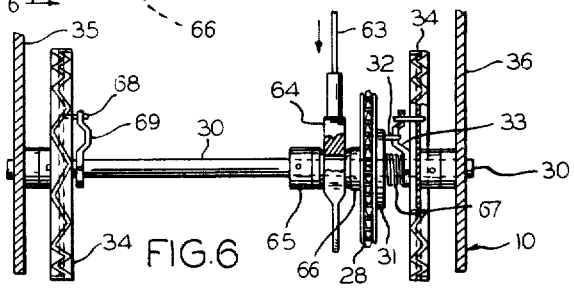
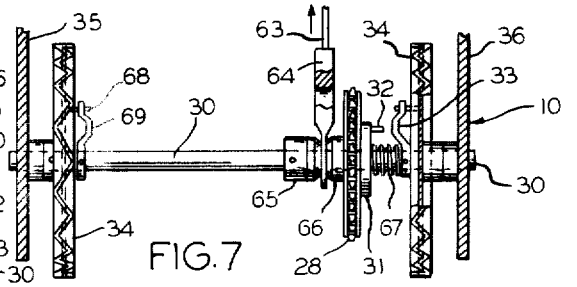
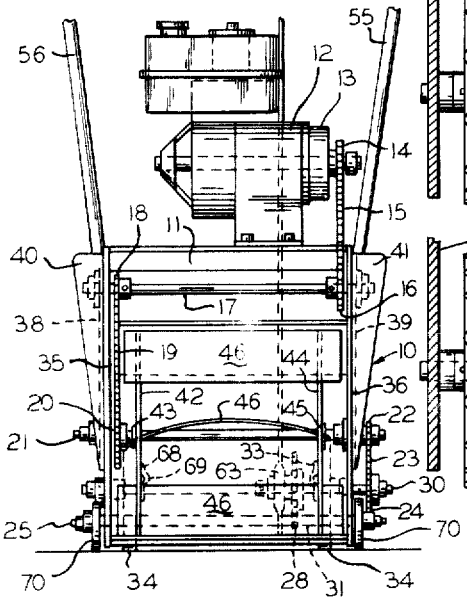
INVENTOR
GEORGE H. RUBIN
BY Robert J. Steininger
ATTORNEY United States Patent Office Re. 26,010
Reissued May 3, 1966

26,010
SNOW THROWERS

George H. Rubin, 624 Marquette Ave.,
South Milwaukee, Wis.

Original No. 3,065,555, dated Nov. 27, 1962, Ser. No. 114,689, June 5, 1961. Application for reissue July 8, 1964, Ser. No. 385,100
7 Claims. (Cl. 37—43)

Matter enclosed in heavy brackets [ ] appears in the original patent but forms no part of this reissue specification; matter printed in italics indicates the additions made by reissue.

This invention relates to improvements in snow throwers, and more particularly to a novel snow thrower of the motor driven type.

An object of the invention is to provide a device of the type having a superior bi-directional chute construction.

Another object of the invention is to provide a device having novel blade construction and arrangement for efficiency in snow removal operations.

Other and further objects of the invention will appear as the description proceeds, reference being had to the accompanying drawing, in which:

FIG. 1 is a side view in elevation of a snow thrower embodying the invention.

FIG. 2 is an opposite side view of the machine.

FIG. 3 is a view taken on line 3—3 of FIG. 2.

FIG. 4 is a rear view in elevation of the device.

FIG. 5 is a view in perspective partially broken away.

FIG. 6 is a plan view partly in elevation and partly in section of the clutch mechanism as engaged.

FIG. 7 is a rear view in elevation of the clutch mechanism shown disengaged.

FIG. 8 is a plan view in elevation of one of the ground-bearing rear wheels.

FIG. 9 is a fragmentary side view in elevation of the machine showing a runner attachment in place.

FIG. 10 is a vertical sectional view taken on line 10—10 of FIG. 9.

Referring more particularly to the drawings, the numeral 10 refers to the casing of the snow thrower, provided with angles 11 supporting the engine 12. The reducing gear 13 has a sprocket 14 connected by the chain 15 with the sprocket 16 on shaft 17. A second sprocket 18 on shaft 17 is connected by chain 19 with the gear 20 on the paddle shaft 21.

The sprocket 22 fixed on paddle shaft 21 is connected by chain 23 with sprocket 24 on the jack shaft 25. A sprocket 26 on shaft 25 is connected by chain 27 with the clutch sprocket 28, mounted freely on shaft 30. Sprocket 28 has integral therewith the disc 31 and a laterally outwardly extending pin 32 which is eccentrically disposed relative to shaft 30 and which at times drivingly engages a laterally inwardly extending driven stop 33 which is fixed to a driven ground-bearing wheel 34, shown as the right hand wheel in FIGURES 6 and 7. The side members 35 and 36 of casing 10 are vertically disposed and have attached thereto by means 37 the frontal plates 38 and 39 which have outwardly diverged upper corners 40 and 41.

[The paddle shaft 21 has fixed thereto the bars 42, 43, 44 and 45 which carry the arcuate blades 46, the latter being set within inclined cut out portions of the ends of said bars.

The casing 10 centrally and rearwardly thereof carries two vertically spaced, opposed and upwardly inclined plates 50 and 51. Two axially aligned bolts 52 extend]

*The paddle shaft 21 has fixed thereto bars 42, 43, 44 and 45 which carry the arcuate blades 46, the latter being set within inclined cut out portions of the ends of said bars; all of which combine to comprise a rotating blade assembly with paddle shaft 21 as the axis of rotation. Centrally and rearwardly of the snow thrower, casing 10 is comprised of Sections 90 and 91 inclined upwardly and rearwardly. Vertically spaced plates 50 and 51, respectively, are mounted on said sections and extend upwardly and rearwardly thereof. Between said sections 90 and 91 is a lateral snow discharge opening having an upper side 92 and a lower side 93 in casing 10. Two axially aligned bolts 52 extend* through the plates 50, 51 and through the vertically spaced and opposed legs of a yoke 53 to pivotally mount the latter. Yoke 53 includes a curved web which is secured by any suitable means, not shown, to the outer surface of a semi-cylindrical chute 54. Helical springs load the bolt heads into engagement with plates 50, 51 and the legs of the yoke 53 to increase friction and resist pivoting of the chute 54. Thus, the chute 54 in the position of FIGURE 4 is located to discharge snow to the left of the thrower. However, if the left end of the chute 54 is pushed forwardly against the friction of the spring pressed bolts 52, the right hand end will extend to the rear and snow will be discharged to the right in a manner readily understood. It will be apparent that the chute 54 may be manually placed to throw the snow to right or left of the machine as may be desired.

Attached to [causing] *casing* 10 are a pair of handle arms 55 and 56 provided with hand grips 57 and secured to the casing by bolt 58. Extra apertures at 59 in casing 10 provide for an adjustment of handle arm inclination. A cross arm 60 connects the handle arms 55 and 56 and carries a bracbet 61 and the pivoted hand lever 62 attached pivotally to the rod 63 fitted at the lower end thereof with a clutch member 64.

With the hand lever 62 pulled up, FIG. 7, the rear wheels 34 are free wheeling, whereas when the hand lever 62 is pushed forwardly to force the rod 63 downwardly, FIG. 6, the clutch member 64 is pushed between the conical elements 65 and 66. Conical element 65 is fixed to the shaft 30, whereas element 66 is free to move against the spring 67, thus bringing pin 32 into engagement with the stop 33 to drive the right hand wheel 34, FIGURES 6 and 7. The left hand wheel 34 carries a laterally outwardly extending pin 68 which impinges against the side of a laterally inwardly extending stop 69 which is opposite to that of the stop 33 which is engaged by pin 32. Thus, a differential movement of the two wheels 34 is thus provided for.

The front ground bearing wheels 70 are extremely narrow to expedite movement through the snow, whereas the rear wheels 34 are formed to provide a continuous angular weaving edge to the running surface for maximum traction. In FIG. 6 the clutch mechanism is shown engaged whereby the machine may be power driven. In FIG. 7 the clutch is disengaged and the machine may be hand driven. In FIGS. 9 and 10 a modified form of the invention is shown, in which a runner 80 is attached to each plate 81 by a pin 82 and to each end of the shaft 83 by a nut 84, on each side of the casing 86.

In use, the blades 46, viewed from the left side of the machine turn counterclockwise and throw the snow backwardly and upwardly in a semi-circle in a spiral movement through the chute 54 as it is placed to either side of the machine, therefore eliminating any clogging up in the chute by damp and wet snow.

It will be understood that the device is capable of many modifications in structure and design, without departing from the spirit of the invention, within the scope of the appended claims.

Having thus described the invention, what is claimed and desired to be secured by Letters Patent of the United States, is:

1. In a snow thrower including a casing, a source of power supported thereon, a rotating blade assembly in said casing forwardly thereof and operably connected to said source of power, and an upwardly inclined ramp rearwardly of said blade assembly; the improvement comprising a pair of vertically spaced opposed and upwardly inclined plates secured to said casing rearwardly and centrally thereof to define an outlet at the top of said ramp, a yoke including a web and two vertically spaced and opposed legs disposed between said plates, means pivotally connecting said legs to said plates, and a reversible snow discharging chute fixed to said web between said plates.

2. A snow thrower according to claim 1, wherein said *means pivotally connecting said legs to said plates includes* [bolts include] springs loading said legs of said yoke into frictional engagement with said plates to resiliently resist reversing of said chute.

3. A snow thrower according to claim 1, there being at least a pair of ground engaging wheels supporting said casing, an axle mounting said wheels, a clutch member slidably and rotatably mounted on said axle laterally inwardly of one of said wheels, means operatively connecting said source of power to said clutch member to rotate the latter, a laterally outwardly extending drive member fixed to said clutch, a laterally inwardly extending stop fixed to said last named wheel, manually operable clutch operating means for moving said clutch member laterally along said axle whereby to move said drive member into and out of driving engagement with one side of said stop.

4. A snow thrower according to claim 3, there being a laterally inwardly extending pin fixed to at least the other of said wheels, a stop fixed to said axles laterally inwardly of said other wheel, and said last named pin engaging said last named stop on the side thereof opposite to the side of the first named stop engaged by said first named pin, whereby to provide a differential mechanism.

5. A snow thrower according to claim 1, there being at least a pair of ground engaging wheels supporting said casing, an axle mounting said wheels, clutch means for selectively connecting said source of power to one of said wheels, and means providing a differential mechanism for the other of said wheels.

6. In a snow thrower including a casing, a source of power supported thereon, rotary means operatively connected to said source of power, and reversible chute means for selectively throwing snow from said rotary means either to the right or the left of said casing; the improvement comprising at least a pair of ground engaging wheels supporting said casing, an axle mounting said wheels, a clutch member slidably and rotatably mounted on said axle laterally inwardly of one of said wheels, means operatively connecting said clutch member to said source of power for rotation thereby on said axle, a laterally outwardly extending drive member fixed to said clutch member, a laterally inwardly extending driven stop member fixed to said last named wheel, manually operable clutch operating means carried by said thrower for moving said clutch member laterally along said axle whereby to move said drive member thereof into and out of driving engagement with said driven stop member so as to drive said last named wheel.

*7. In a snow throwing machine, a casing comprising a pair of longitudinally extending, substantially parallel, vertical plates, a source of power mounted on the top of said casing, a transversely extending blade assembly rotatably mounted between said plates, drive means between said source and said blade assembly, a pair of spaced upwardly and rearwardly inclined, substantially parallel, transversely extending plates fixed between said vertical plates and located rearwardly of said blade assembly, said vertical plates having side openings between said inclined plates and extending forwardly therefrom, a generally transversely extending discharge chute pivotally mounted intermediate its ends between said inclined plates, said chute being pivotally mounted to mate with either of said side openings to discharge snow to either side of the machine.*

References Cited by the Examiner

The following references, cited by the Examiner, are of record in the patented file of this patent or the original patent.

UNITED STATES PATENTS

| | | | |
|---|---|---|---|
| D. 186,948 | 12/1959 | Anderson | 40—1 |
| 570,952 | 11/1896 | Plass. | |
| 1,587,449 | 6/1926 | Wandscheer | 37—43 |
| 1,588,745 | 6/1926 | Kear | 37—41 |
| 1,649,283 | 11/1927 | Broughton | 192—24 |
| 1,779,994 | 10/1930 | Tatter | 301—41 |
| 2,104,265 | 1/1938 | Marsden | 192—24 |
| 2,200,623 | 5/1940 | James | 37—43 |
| 2,224,870 | 12/1940 | Jensen | 37—43 |
| 2,487,936 | 11/1949 | McCrady et al. | 192—93 X |
| 2,545,470 | 3/1951 | Kear | 37—24 X |
| 2,605,561 | 8/1952 | Maynard | 37—43 |
| 2,627,155 | 2/1953 | Shuler | 37—43 |
| 2,695,071 | 11/1954 | Hupp. | |
| 2,770,893 | 11/1956 | Jacobs | 37—43 |
| 2,794,271 | 6/1957 | Wallack | 37—43 |
| 2,871,585 | 2/1959 | Merry | 37—43 |
| 2,919,504 | 1/1960 | Rubin | 37—53 |
| 2,977,694 | 4/1961 | Higby | 37—43 |
| 3,028,694 | 4/1962 | Creighton | 37—8 |
| 3,052,048 | 9/1962 | Fiske | 37—53 |
| 3,074,189 | 1/1963 | Phelps | 37—43 |

ABRAHAM G. STONE, *Primary Examiner.*

CHARLES E. O'CONNELL, BENJAMIN HERSH, *Examiners.*

G. T. MOLLER, F. B. HENRY, *Assistant Examiners.*